June 18, 1968  J. R. WALLER, JR  3,389,390
REMOTE DEVICE CONTROL SYSTEM AND APPARATUS
Filed Aug. 6, 1964
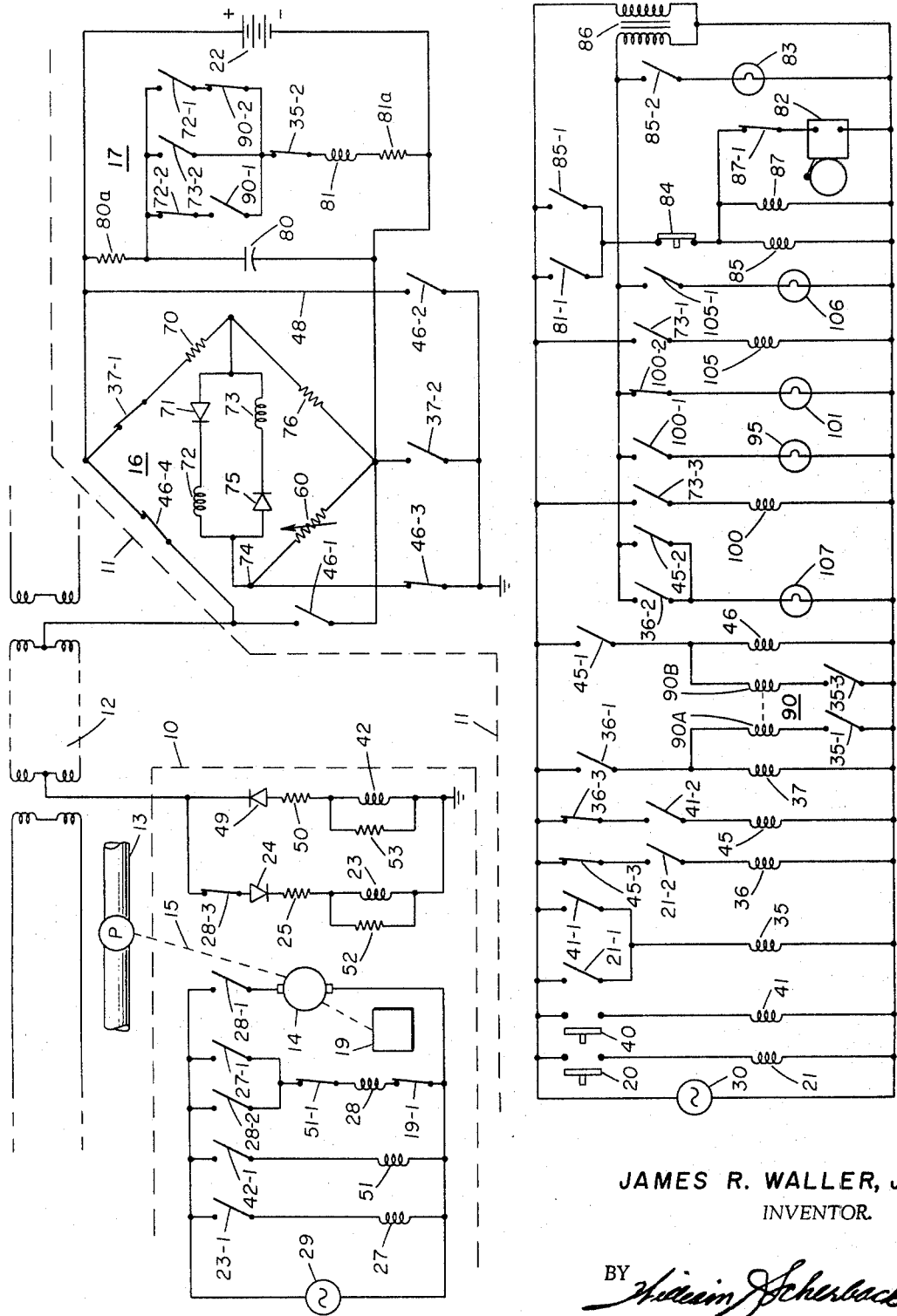
JAMES R. WALLER, JR.
INVENTOR.
BY *William J. Scherback*
ATTORNEY United States Patent Office 3,389,390
Patented June 18, 1968

3,389,390
REMOTE DEVICE CONTROL SYSTEM
AND APPARATUS
James R. Waller, Jr., Dallas, Tex., assignor to Mobil Oil
Corporation, a corporation of New York
Filed Aug. 6, 1964, Ser. No. 387,741
13 Claims. (Cl. 340—409)

This invention relates to a system and apparatus for controlling a device and for sensing both normal and abnormal conditions of the device, and more particularly to a system that is adapted for controlling the energization and de-energization of a remote device from a control station and for supervising, at the control station, the condition of the device and of an electrical circuit connecting the device and the station.

While this invention is adaptable to the control of many and varied types of devices, it is particularly adapted to the operation of a pipeline pumping station and so will be described herein.

Due to the nature of pipeline operations, a pumping station is intermittently operated. Such operation in the past has required the presence of an operator to turn a pump on and off and generally to be present at all times to supervise pump station operation. While apparatus is presently available to provide for control and supervision of remote devices from a central control station, the present invention embodies features which render it more dependable and useful over a wider range of operating conditions.

In accordance with the present invention, there is provided a system for controlling from a control station a remote device and for sensing or monitoring conditions of the device. The system includes means at the device for energizing and de-energizing it. Control of the energizing and de-energizing means is had from the control station. The control station and the energizing and de-energizing means are interconnected by a single electric circuit provided by at least one transmission line. A source of direct current of reversible polarity is located at the control station for device actuation, deactivation, and for supervision. The de-energizing means is responsive to a direct current signal of predetermined amplitude and of one polarity, while the energizing means is responsive to a direct current signal of the predetermined amplitude but of an opposite polarity. The polarity of direct current to be applied to the electric circuit is determined at the control station. An impedance responsive means, located at the control station, senses the condition of the device and is connected in the electric circuit to limit the amplitude of direct current applied to the circuit to a level below the predetermined amplitude during a condition-sensing period. The impedance responsive means is disconnected whenever the polarity selecting means is operated in order that there be applied to the electric circuit and to the energizing and de-energizing means a direct current of the aforementioned predetermined amplitude and selected polarity.

Further in accordance with the present invention, there is provided an alarm circuit which, during actuation of the polarity selecting means, is disconnected or inhibited and is further uniquely arranged to provide for the generation of an alarm condition upon the occurrence at the device of an operating condition other than that last instructed from the control station. Specifically, the alarm circuit responds to abnormal conditions occurring at the device. A latching means responds to control actions initiated at the control station to precondition the alarm circuit for response only to conditions at the device other than those resulting from the previous control action initiated at the control station.

In another aspect of the present invention, the impedance responsive means includes a bridge circuit, one leg of which is provided, at least in part, by the electric circuit and the device energizing means.

For objects and for further attendant advantages of the present invention, reference will now be had to the following detailed description taken in conjunction with the accompanying drawing which illustrates, in schematic form, one embodiment of the present invention applied to the control of a pipeline pumping station.

Referring now to the drawing, there is illustrated a remote device 10 and a control station 11 interconnected by way of a single electric circuit or transmission line 12, shown to be a simplex loop. The device 10 is a pipeline pumping station which includes a pump P for delivering fluid products along the pipeline 13. The pump P is driven from a motor 14, shown mechanically coupled to the pump by way of dashed line 15. The motor 14 is intermitently energized and de-energized, depending upon operating conditions for the pipeline 13, from the control station 11. Start and stop functions are initiated at the control station 11. In addition, conditions existing at the device 10 are detected or sensed by an impedance responsive means 16. The sensed conditions are translated into alarm indications, audible, visual, or both, by way of an alarm circuit including a network 17.

The remotely located motor 14, shown for simplicity to be of the single phase type, is energized from the control station 11 by closing hand-operated switch 20 to energize relay coil 21 in order to apply to the transmisison line 12 from battery 22 a direct current signal of one polarity, which in this instance is positive and of predetermined amplitude. The direct current signal is effective to operate relay 23, a device energizing means, by flow of current through rectifier 24 and resistor 25.

The operation of relay 23 completes a circuit to energize the motor 14. Operation of relay 23 causes its contact 23-1 to close, in turn to energize the coil of relay 27 from a source of alternating current 29. Relay contact 27-1 is now closed to in turn energize relay 28 whose contact 28-1 now connects the motor 14 across the source of alternating current 29. The relay 28 is latched in an operating condition by closure of its contact 28-2.

It will be noted from an examination of the drawing that the sensing or detecting means 16 is a Wheatstone bridge having one leg thereof provided, at least in part, by the high side of transmission line 12, the operating coil of relay 23, and the return ground or low side path. It is to be further noted that, as shown, the Wheatstone bridge 16 is connected across the power supply, represented by battery 22; and current of low amplitude flows through the line 12 for supervision purposes. Whenever an action, either energizing or de-energizing, is initiated at the control station, the bridge circuit 16 is disconnected to permit the full potential of battery 22 to be applied to transmission line 12 to provide the high current necessary to operate relay 23.

The bridge 16 is disconnected and high current applied whenever the start switch 20 is closed. It will be recalled that with the closure of switch 20, relay 21 was energized from an alternating current source 30. The energization of relay 21 causes its contact 21-1 to close and thereby to energize relay 35. In addition, relay contact 21-2 is closed to energize relay 36. The operation of relay 36 closes its contact 36-1 to energize relay 37 to effect a disconnection of the bridge 16, while the operation of the relay 35 conditions the alarm circuit 17 for response to the occurrence of an abnormal operating condition of the remote device and to inhibit or disconnect the alarm circuit during the time that control actions are being effected.

The bridge is disconnected by the opening of relay contact 37–1 and the closure of relay contact 37–2. The closure of contact 37–2 connects the negative side of the battery 22 to ground, or the low side of the transmission line 12, whereas the opening of contact 37–1 opens one leg of the bridge 16, effectively to disconnect the bridge from the high side of the circuit 12. Maximum current now flows from the positive side of battery 22 to the device energizing relay 23 by way of the high side of the transmission line or circuit 12.

Although the closure of hand-operated switch 20 is momentary, the full potential of battery 22 is applied to the transmission line 12 for a longer period, for example, about ten seconds, under control of relay 36. Relay 36 is of the slow release type which will hold in an operated state for a predetermined period of time in response to a momentary control pulse. The relay 36 then drops out to reconnect the bridge to the line 12 for supervision of conditions at the device and the condition of the circuit 12.

The motor 14 is de-energized or stopped by closing hand-operated switch 40 located at the control station 11. The closing of hand-operated switch 40 energizes relay 41 to set in motion a series of events, ultimately resulting in the application to the transmission line 12 of a direct current of opposite, in this case negative, polarity to operate the motor de-energizing relay 42. The sequence of events is as follows. The energization of relay 41 causes its contacts 41–1 and 41–2 to close, energizing respectively relays 35 and 45. The energization of relay 35 again conditions the response and inhibits the operation of the alarm circuit 17, whereas the operation of relay 45 and the closure of its contact 45–1 causes the energization of relay 46 which in turn disconnects the bridge 16 for a short period of time during which the control action is to be effected.

The operation of relay 46 causes relay contacts 46–1 and 46–2 to close and contacts 46–3 and 46–4 to open. The bridge is now disconnected from the transmission line and the positive side of battery 22 is grounded by way of conductor 48 and closed relay contact 46–2. The negative side of the battery 22 is connected by way of closed contact 46–1 to the transmission line 12. As a result, the maximum potential of the battery 22, negative in polarity, is applied to the transmission line 12 and thence by way of diode 49 and resistor 50 to the operating coil of relay 42.

The motor 14 is de-energized upon operation of relay 42 by closure of relay contact 42–1 which energizes relay 51, whose contact 51–1 opens the circuit to relay 28. Relay 28 is de-energized to open its contact 28–1 and to disconnect the motor 14 from the alternating current supply 29.

The energizing and de-energizing circuits associated with the motor 14 are designed to be relatively unaffected by any noise signals that may be applied by way of or induced into the transmission line 12. By noise signal is meant any signal other than the signal deliberately generated at the control station as by closure of the start switch 20 or the stop switch 40. For example, these noise signals may take on the character of low level transients of relatively long duration. With this in mind, the operating coils of the relays 23 and 42 are shunted, respectively, by resistors 52 and 53 so that the relays 23 and 42 will respond only to signals of high amplitude. On the other hand, these noise signals may be transients of high amplitude which usually can be expected to be of very short duration, such for example as transients induced by electrical storms. To this end, the relays 27 and 51 are of the slow acting type so that despite the response of relays 23 and 42 to such high level, short duration transients, the relays 27 and 51 will not be actuated.

*Supervision and detection*

During periods other than those when a control action is initiated at the station, the Wheatstone bridge detector 16 is connected as shown for supervision of conditions existing at the device 10; and supervision current of low amplitude flows along the line and through relay coil 23. The Wheatstone bridge 16 initially is balanced by adjusting the variable resistor 60 with the device 10 de-energized. The bridge 16 is then ready to detect unbalanced currents that will be generated whenever the relay contact 28–3 at the device 10 is opened, when the transmission line 12 is connected by a very low impedance to ground, or when both conductors of transmission line 12 are connected by way of a low impedance to ground, i.e., shorted to ground. The detector and the associated indicating circuitry are capable of detecting and indicating the following conditions:

(1) The motor 14 stopped when it should be running;
(2) The motor 14 running when it should be stopped;
(3) Overload of the motor 14 as reflected by high temperature and any other abnormal condition existing at the motor during running operations, for example, excessive vibrations and high bearing temperature;
(4) Open transmission line during the time the motor is stopped; and
(5) Grounded transmission line.

Signals representative of conditions at the device 10 are generated by the relay contact 28–3 in either its closed position or its open position. Whether the position of the contact 28–3 represents an abnormal condition will depend in certain instances upon the condition of the device and the action called for at the control station.

Assuming that the hand-operated start switch 20 has been closed and the motor is now running, relay contact 28–3 will be open and bridge 16 unbalanced. As a result of unbalance, current flows from the positive side of battery 22 through resistor 70, diode 71, the operating coil of relay 72, variable resistor 60, and thence to the opposite side of battery 22.

Should the motor 14 become overloaded, as above described, the relay contact 28–3 will close and the bridge 16 will come to balance. Motor overload is detected by a sensing device 19 to open contact 19–1 and de-energize relay 28. Suitable overload detectors for electric motors are well known to those skilled in the art.

The bridge 16 will be unbalanced in an opposite direction to operate relay 73 upon a shorting of the transmission line 12 to ground. In such event, point 74 of the bridge is effectively connected directly to the positive side of the battery 22 and current flows through the diode 75, the operating coil of relay 73, the resistor 76, and thence to the negative side of battery 22.

These sensitivity of the bridge is such that a high degree of reliability is achieved in that large leakage currents from the transmission line to ground can be tolerated. More specifically, the unbalance currents through the bridge due to leakage on the transmission line will not be large enough to operate the relays 72 and 73. For example, the relay 72 will operate only in the event leakage conditions approaching impedances of the order of 2.5K exist. This is a very high value of line leakage and normally not encountered in normal operations.

In summary, the bridge 16 will become unbalance in response to the operating of relay contact 28–3 to energize relay 72. The bridge 16 will become unbalanced in an opposite direction upon shorting to ground of the transmission line 12 to energize relay 73. When the bridge is balanced, signifying that contact 28–3 is closed, both relays 72 and 73 are de-energized. With this operation in mind, there will now be undertaken a description of how the condition of the bridge is employed in conjunction with the action last called for at the control station to identify and to give notice of an abnormal condition existing at the device 10 and of the condition of the transmission line 12.

*Alarm and indicating system*

The alarm system is designed to provide an indication, either audible. visual, or both, whenever a condition that is different from the one last called for exists at the device. For example, if the stop switch 40 has been closed, an alarm will sound if the device fails to become de-energized. An alarm also will sound if the start switch 20 is closed and the unit fails to become energized.

The alarm circuit includes a network 17 shown arranged circuitwise under conditions existing when the stop switch 40 has been closed and the motor 14 de-energized. Should the motor 14 accidentally become energized during this period, the relay contact 28–3 will open and the bridge 16 will become unbalanced to operate relay 72. The energization of relay 72 will cause its contact 72–1 to close, applying current from a previously charged capacitor 80 to energize relay 81. The energization of relay 81 will cause audible alarm 82 to sound and will also cause the illumination of a visual alarm represented by the lamp 83. The operation is as follows. Relay contact 81–1 is closed to apply alternating current by way of hand-operated switch 84 to the operating coil of relay 85. Relay contact 85–1 is now closed to hold relay 85 in an operative state. At the same time, relay contact 85–2 is closed to connect the lamp 83 across the secondary of step-down transformer 86. The audible alarm represented by the bell 82 is connected across the source of alternating current upon closure of relay contacts 81–1 and 85–1.

The audible alarm 82 will continue for a period of time determined by the pickup time of slow operating relay 87. After a predetermined time interval, the relay 87 will become energized to open its contact 87–1 and disconnect the audible alarm 82 from its source of alternating current. At any time at the discretion of an operator, the audible alarm 82 may be silenced by opening hand-operated switch 84.

After the alarm condition has been corrected at the device, capacitor 80 immediately will begin to recharge from battery 22 by way of resistor 80a. When the capacitor 80 has been charged, the alarm circuit 17 will now be ready to respond to a subsequent-occurring alarm condition on the transmission line 12 or at the device 10.

Assuming now that conditions are normal and that it is desired to start the motor 14, the hand-operated switch 20 will be closed to initiate the series of actions previously described to energize the motor 14. In addition, there will be initiated a series of events which will now condition the alarm circuit 17 to respond to a balanced condition of the bridge and to produce an alarm signal should the relay contact 28–3 close. It will be recalled that relay 35 is energized whenever the start switch 20 is closed. The operation of relay 35 causes its contact 35–1 to close and to complete a circuit upon closure of relay contact 36–1 to energize one coil 90A of a latch relay 90. The latch relay, a memory device, can be either of the mechanical or magnetic latch variety. In addition, relay contact 35–2 in the alarm circuit 17 is opened to disconnect the alarm circuit or otherwise inhibit its operation during the time that the control action is being undertaken.

The energization of the coil 90A of the latch relay 90 rearranges the alarm circuit network 17 as by closing contact 90–1 and opening contact 90–2. Thus, the latch relay 90 provides a means which responds to the control action taken at the control station for preconditioning the alarm circuit for response only to conditions at the load other than those resulting from the previous control initiated at the control station. In other words, the alarm network 17 is now arranged to produce an alarm signal when the bridge is balanced.

It is important that the alarm circuit be inhibited or be made nonresponsive during the time the control action is taking place and the bridge is reaching a stable condition, such as, for example, balance or unbalance. For this reason, the relay contact 35–1 is placed in series with the operating coil 90A of the latch relay 90, and relay contact 35–2 is in series with the operating coil of relay 81.

With the motor running, the bridge 16 is unbalanced and the relay 72 is energized. Relay contact 72–2 is open and relay contact 72–1 is closed. The alarm system is now conditioned such that, should the bridge come to balance as by closure of relay contact 28–3, an alarm will be sounded by reason of a circuit being completed from capacitor 80 through relay contacts 72–2, 90–1, 35–2, the operating coil of relay 81, and resistor 81a. An indication that the motor is running is provided by lamp 95 which is illuminated as a result of the operation of relay 72.

The energization of relay 72 causes its contact 72–3 to close and complete a circuit to energize relay 100. The operation of relay 100 causes its contact 100–1 to close to connect the lamp 95 across the secondary of step-down transformer 86. At the same time, lamp 101, employed to indicate a de-energized condition of the device 10, is turned off by opening of relay contact 100–2.

When the hand-operated stop switch 40 is closed, coil 90B of latch relay 90 is energized through a sequence of operations which involve closure of contacts 45–1 and 35–3 to move latch relay contacts 90–1 and 90–2 to the positions illustrated. The alarm circuit is now once again in a condition to respond to unbalance of the bridge as occasioned by an accidental start of the motor 14 and also by an open transmission line.

The alarm circuit is at all times conditioned to respond to bridge unbalance occasioned by the shorting to ground of the transmission line 12. Whenever the transmission line 12 is grounded, the bridge 16 is unbalanced in a direction to energize relay 73 and to close its contact 73–2 in the alarm network 17. The closure of contact 73–2 will complete a circuit from the capacitor 80 through the operating coil of the relay coil 81 and resistor 81a. At the same time, relay contact 73–1 is closed to energize relay 105 and energize indicating lamp 106 by closure of contact 105–1.

The existence of a control action is indicated by the lamp 107. Whenever a start command is initiated, the relay 36 is energized to close contact 36–2 and to connect the lamp 107 across the secondary of the transformer 86. Likewise, whenever a stop action is initiated, the relay 45 will be energized to close its contact 45–2 similarly to connect the lamp 107 across the secondary of transformer 86. The lamp 107 will remain illuminated so long as either of the relays 36 or 45 is energized.

Interlock relay contacts 45–3 and 36–3 are provided respectively in series with the operating coils of relays 36 and 45 in order to prevent a second control action from being initiated before the first control action is completed. In the absence of the interlock feature, an attempt to close both the start and stop switches 20 and 40 would result in a short-circuiting of the battery 22.

While the source of direct current has been illustrated as a battery, it will be understood that the system illustrated can be operated with any source of unidirectional current, for example, pulsating direct current.

In the particular embodiment described and used, the values of elements in the bridge circuit are as follows: resistor 70 is 500 ohms, resistor 76 is 2,000 ohms, variable resistor 60 is 5,000 ohms, resistors 25 and 50 are 450 ohms, resistors 52 and 53 are 600 ohms, relay 72 is a Sigma No. 22 RJCC (5,000-ohm coil), relay 73 is a Sigma No. 22 RJC (5,000-ohm coil), relays 23 and 42 are C.P. Clare No. SK5028 (6,500-ohm coil), and the resistance of the transmission line is 50 ohms.

Now that a preferred embodiment of the invention has been described, it will be understood that modifications will occur to those skilled in the art and it is intended to cover all such modifications as fall within the scope of the appended claims.

What is claimed is:
1. A system for controlling a device at a remote station and for sensing the condition of the device, comprising:
   (a) means adjacent the device for energizing and de-energizing the device,
   (b) means at a control station remote from the device for controlling said energizing and de-energizing means,
   (c) a single electric circuit for interconnecting said controlling means and said energizing and de-energizing means,
   (d) a source at the control station of direct current of reversible polarity,
   (e) said de-energizing means being responsive to a direct current signal of predetermined amplitude and of one polarity and said energizing means being responsive to a direct current signal of said predetermined amplitude and of an opposite polarity,
   (f) means at the control station for selecting the polarity of direct current to be applied by way of said single electric circuit to said energizing and de-energizing means,
   (g) an impedance responsive means connected in said electric circuit and to said source for sensing the condition of the device and said circuit and for limiting during sensing periods the amplitude of said direct current to a level below said predetermined amplitude, and
   (h) means responsive to said polarity selecting means for disconnecting said impedance responsive means from said circuit for application to said energizing and de-energizing means of a direct current of said predetermined amplitude and a selected polarity.

2. The system of claim 1 in which said impedance responsive means comprises:
   (a) a Wheatstone bridge including in a first leg thereof said electric circuit and said energizing and de-energizing means,
   (b) a first diagonal of said bridge connected across said source of direct current,
   (c) a second leg of said bridge including an impedance for limiting during sensing periods the amplitude of current applied to said circuit by said source, and
   (d) a detecting means connected across a second diagonal of said bridge.

3. The system of claim 1 wherein said electric circuit includes a high side and a low side and said impedance responsive means comprises:
   (a) a Wheatstone bridge having a first diagonal connected across said source of direct current,
   (b) a detecting means connected across a second diagonal of said bridge,
   (c) a first leg of said bridge including said high side of said electric circuit and said energizing and de-energizing means,
   (d) a normally closed switch connected in said first leg at the control station end of said electric circuit, a second leg of said bridge having a first end connected to said first leg and to one side of said source of direct current and a second end connected to one side of said detecting means and including a second normally closed switch,
   (e) a third leg of said bridge including a variable impedance and having a first end electrically connected to an opposite side of said detecting means and having a second end connected to an opposite side of said source of direct current,
   (f) said first end of said third leg being connected by way of a first normally closed circuit to said low side of said electric circuit,
   (g) a first normally open circuit for connecting when closed said one side of said source to said low side of said electric circuit,
   (h) a second normally open circuit for connecting when closed said opposite side of said source to said low side of said electric circuit,
   (i) a third normally open circuit for connecting when closed said opposite side of said source to said high side of said electrical circuit at said control station,
   (j) means responsive to initiation of a device energizing signal generating at said control station for opening said normally closed switch in said second leg of said bridge and for closing said second normally open circuit for applying to said energizing means said direct current signal of predetermined amplitude and polarity, and
   (k) means responsive to the initiation of a device de-energizing signal at said control station for opening said normally closed switch in said first leg of said bridge, for closing said first normally open circuit and said third normally open circuit and for opening said first normally closed circuit for applying to said electric circuit a de-energizing signal of polarity opposite from said energizing signal and of said predetermined amplitude.

4. The system of claim 1 wherein there is provided an alarm indicating circuit for indicating an abnormal condition of the device, comprising:
   (a) a relay,
   (b) means for actuating said relay when said device is in a de-energized state following the initiation of an energizing signal, and
   (c) means for actuating said relay when said device is in an energized state following the initiation of a de-energizing signal.

5. The system of claim 2 in which said detecting means comprises:
   (a) two relays connected in parallel across said second diagonal,
   (b) a first diode connected in series with one of said relays and poled in a first direction,
   (c) a second diode connected in series with another of said relays and poled in an opposite direction, and
   (d) means responsive to the states of said relays for indicating device conditions.

6. The system of claim 3 wherein means responsive to the states of said relays for indicating conditions of said device comprises a network including:
   (a) a third relay, and
   (b) two parallel branches in series with said third relay and each including means operatively connected to one of said parallel-connected relays for completing a first circuit through one of said parallel branches to energize said third relay when said device is in a de-energized state following the initiation of an energizing signal, and for completing a second circuit through the other of said parallel branches when said device is in an energized state following the initiation of a de-energizing signal to energize said third relay.

7. The alarm system of claim 6 wherein said network further includes a third parallel branch, means in said third branch responsive to the other of said parallel relays in said diagonal of said bridge for energizing said third relay upon said transmission line being shorted to ground.

8. A system for controlling a device at a remote station and for sensing the condition of the device, comprising:
   (a) means adjacent the device for energizing and de-energizing the device,
   (b) means at a control station remote from the device for controlling said energizing and de-energizing means,
   (c) a single electric circuit for interconnecting said controlling means and said energizing and de-energizing means,
   (d) a source at the control station of direct current of reversible polarity for both control and sensing,
   (e) said de-energizing means being responsive to a direct current signal of predetermined amplitude and of one polarity and said energizing means being responsive to a direct current signal of said predetermined amplitude and of an opposite polarity, (f) a variable impedance means at the remote station responsive to operating conditions of the device, (g) means at the control station for selecting the polarity of direct current to be applied by way of said single electric circuit to said energizing and de-energizing means, (h) an impedance responsive means connected in said electric circuit and to said source for sensing the condition of the device and said circuit and for limiting during sensing periods the amplitude of said direct current to a level below said predetermined amplitude, and (i) means responsive to said polarity selecting means for disconnecting said impedance responsive means in said circuit for application of a direct current of said predetermined amplitude and a selected polarity to said energizing and de-energizing means.

9. A system as in claim 8 in which said energizing means and said de-energizing means are connected in circuits which are parallel to one another, and in which said variable impedance is a switch whose contacts are in series with one of said parallel circuits, and which switch is closed when said device is in one condition and open when said device is in another condition.

10. A system as in claim 8 in which said variable impedance is a switch in series with said energizing means, and which switch is closed when said device is de-energized and open when said device is energized.

11. In a system for controlling the operation of a remotely positioned device wherein energizing and de-energizing signals are transmitted to the device from a control station by way of a transmission line, the combination of:

(a) means at the control station for initiating an energizing signal, (b) means at the control station for initiating a de-energizing signal, (c) detecting means at the control station for sensing by way of the transmission line conditions of the device, (d) an alarm indicating means including an electrical network at the control station and operatively connected with said sensing means, (e) means responsive to the initiation of an energizing signal for conditioning said network for response to said detecting means for production of an alarm signal upon de-energization of said device following said energizing signal and absent a de-energizing signal, and (f) means responsive to the initiation of a de-energizing signal for conditioning said network for response to said detecting means for production of an alarm signal upon energization of said device following said de-energizing signal and absent an energizing signal.

12. A system as in claim 11 in which there is included a latch relay responsive to the initiation of said energizing signal to assume a first state and responsive to the initiation of said de-energizing signal to assume a second state and in which said network comprises:

(a) two parallel branches, and (b) two relay-controlled switches in each branch and connected in series, a first pair of said switches including one switch from each branch operatively connected to said detecting means, a second pair of said switches including the remaining switches in each branch operatively connected to said latch relay, said switches arranged in a first format representing a nonalarm condition by presenting an open circuit in each of said parallel branches with one switch of each pair being open and the other switch of each pair being closed, said detecting means in response to a change in the condition of the device absent a signal from the control station changing the open-close order of said first pair of switches to close one of said open circuits for generation of an alarm signal, and said latch relay being responsive to said signal initiating means to change the open-close order of said second pair of switches to condition said network for generation of an alarm signal in response to a condition of said device other than that last initiated at the control station.

13. A system as in claim 11 including means responsive to the initiation of signals at the control station for disabling said network during the application to the device of either of the energizing and de-energizing sgnals.

References Cited

UNITED STATES PATENTS

| 2,347,523 | 4/1944 | Suksdorf | 318—297 |
| 2,562,485 | 7/1951 | Cruess | 317—137 XR |
| 2,992,366 | 7/1961 | Veltfort | 317—137 |

JOHN W. CALDWELL, *Primary Examiner.*

D. MYER, *Assistant Examiner.*